United States Patent
Sorrentino et al.

(10) Patent No.: US 8,804,686 B2
(45) Date of Patent: Aug. 12, 2014

(54) SIGNALING OF PRECODER RELATED INFORMATION IN A MIMO SYSTEM

(75) Inventors: Stefano Sorrentino, Solna (SE); George Jöngren, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 399 days.

(21) Appl. No.: 13/020,853

(22) Filed: Feb. 4, 2011

(65) Prior Publication Data

US 2011/0200135 A1 Aug. 18, 2011

Related U.S. Application Data

(60) Provisional application No. 61/304,912, filed on Feb. 16, 2010, provisional application No. 61/304,922, filed on Feb. 16, 2010.

(51) Int. Cl.
*H04B 7/216* (2006.01)
*H04J 11/00* (2006.01)
*H04L 12/28* (2006.01)

(52) U.S. Cl.
USPC ............ 370/342; 370/203; 370/208; 370/431

(58) Field of Classification Search
USPC .......................... 370/203, 208, 342, 431, 441
IPC ..... H04B 7/0671,7/0669, 7/063; H04L 27/2613
See application file for complete search history.

(56) References Cited

U.S. PATENT DOCUMENTS

2007/0036066 A1 * 2/2007 Thomas et al. ............... 370/208
2011/0299625 A1 * 12/2011 Hooli et al. .................. 375/295
2012/0170683 A1 * 7/2012 Frederiksen et al. ......... 375/308

FOREIGN PATENT DOCUMENTS

WO WO 2010/097121 * 9/2010 ............. H04L 27/26
WO WO 2010/149206 * 12/2010 ................ H04L 1/16

OTHER PUBLICATIONS

3rd Generation Partnership Project. "OCC and CS for UL RS in SU/MU-MIMO." 3GPP TSG RAN WG1 Meeting #59bis, R1-100378, Valencia, Spain, Jan. 18-22, 2010.
3rd Generation Partnership Project. "DM-RS in Support of UL Spatial Multiplexing." 3GPP TSG-RAN WG1 #59bis, R1-100691, Valencia, Spain, Jan. 18-22, 2010.
3rd Generation Partnership Project. "Uplink DM-RS Resource Configuration for LTE-Advanced." 3GPP TSG RAN WG1 Meeting #60, R1-101008, San Francisco, California, USA, Feb. 22-26, 2010.
3RD Generation Partnership Project. "Considerations on Uplink DM-RS sequence in LTE-Advanced." 3GPP TSG RAN WG1 Meeting #59-bis, R1-100668, Valencia, Spain, Jan. 18-22, 2010, pp. 1-6.

* cited by examiner

*Primary Examiner* — Asad Nawaz
*Assistant Examiner* — Joel Hamel
(74) *Attorney, Agent, or Firm* — Coats and Bennett, P.L.L.C.

(57) ABSTRACT

Techniques are disclosed for signaling a pattern of cyclic shifts and orthogonal cover codes for use by a wireless device in multi-layer transmissions. In one example method, a signal includes B bits for identifying a reference signal is received, wherein each of several available reference signals is defined by a cyclic shift and an orthogonal cover code. The B bits are used to identify the cyclic shift and orthogonal cover code according to pre-determined tables that map each value of the B bits to a pattern of cyclic shift and orthogonal cover code combinations for a multi-layer transmission scheme. The patterns for the multi-layer transmission scheme include first and second patterns based on the same cyclic shifts, but where some, but not all, of the cyclic shifts in the first pattern are associated with the same corresponding orthogonal cover codes in the second pattern.

16 Claims, 5 Drawing Sheets

FIG. 4

SIGNALING OF PRECODER RELATED INFORMATION IN A MIMO SYSTEM

RELATED APPLICATIONS

This application claims priority under 35 U.S.C. §119(e) to U.S. Provisional Patent Application Ser. No. 61/304,912, filed 16 Feb. 2010, and to U.S. Provisional Patent Application Ser. No. 61/304,922, also filed 16 Feb. 2010. The entire contents of both of the foregoing provisional applications are incorporated by reference herein.

FIELD OF THE INVENTION

The present invention relates generally to the control of devices in wireless communication networks, and more particularly relates to techniques for allocating reference signals to spatially multiplexed data transmissions.

BACKGROUND

Multi-antenna techniques can significantly increase the data rates and reliability of a wireless communication system. In particular, throughput and reliability can be drastically improved if both the transmitter and the receiver are equipped with multiple antennas. This arrangement results in a so-called multiple-input multiple-output (MIMO) communication channel; such systems and related techniques are commonly referred to as MIMO systems and MIMO techniques.

The LTE-Advanced standard is currently under development by the 3$^{rd}$-Generation Partnership Project (3GPP). A core component in LTE-Advanced is the support of MIMO antenna deployments and MIMO related techniques for both downlink (base station to mobile station) and uplink (mobile station to base station) communications. More particularly, a spatial multiplexing mode (single-user MIMO, or "SU-MIMO") for uplink communications is being designed. SU-MIMO is intended to provide mobile stations (user equipment, or "UEs" in 3GPP terminology) with very high uplink data rates in favorable channel conditions.

SU-MIMO consists of the simultaneous transmission of multiple spatially multiplexed data streams within the same bandwidth, where each data stream is usually referred to as a "layer." Multi-antenna techniques such as linear precoding are employed at the UE's transmitter in order to differentiate the layers in the spatial domain and to allow the recovery of the transmitted data at the receiver of the base station (known as eNodeB, or enB, in 3GPP terminology).

Another MIMO technique supported by LTE-Advanced is MU-MIMO, where multiple UEs belonging to the same cell are completely or partly co-scheduled in the same bandwidth and during the same time slots. Each UE in a MU-MIMO configuration may transmit multiple layers, thus operating in SU-MIMO mode.

To enable detection of all of the spatially-multiplexed data streams, the receiver must estimate an effective radio channel for each transmitted layer in the cell. Therefore, each UE needs to transmit a unique reference signal (RS) at least for each transmitted layer. The receiver, which is aware of which reference signal is associated to each layer, performs estimation of the associated channel by performing a channel estimation algorithm using the reference signal. The estimated channel is an "effective" channel because it reflects the mapping of the spatially multiplexed layer to multiple antennas. The estimate of the effective channel response is then employed by the receiver in the detection process.

SUMMARY

Methods and apparatus are disclosed for assigning reference signals to transmission layers in a wireless network that supports single-user and/or multi-user MIMO. In particular, techniques are disclosed for efficiently signaling the selection of a pattern of cyclic shifts and orthogonal cover codes to a mobile station, for use by the mobile station in subsequent multi-layer transmissions.

In one general approach to signaling cyclic shift (CS) and orthogonal cover code (OCC) patterns to a mobile station (or other wireless node) for use in determining which reference signals should be mapped to subsequent transmission layers, explicit signaling of B=log 2(N) bits (called a "pattern index" herein) is performed using the uplink grant message, where N equals the number of unique patterns that can be signaled. In LTE-Advanced systems, N=8 and B=3. With this approach, each of the N entries corresponds to a unique predefined joint mapping of cyclic shift and orthogonal cover code, per transmission layer. In some embodiments, a given value for the signaled bits always maps into a single table or other data structure that correlates the signaled values with patterns of CS/OCC assignments to transmission layers. In other embodiments, several tables or other data structures may exist, in which case the mapping of signaled values to CS/OCC assignment patterns may vary depending on additional factors, such as transmission rank, number of transmit antennas used by the UE, the selected codebook, the transmission modality (e.g., Open Loop, Closed Loop, Transmit Diversity).

In some embodiments of the invention, the eNB is configured to use the three bits defined in previous releases of the LTE standards for reference signal assignments, to provide an indication of one of eight different index positions into any of the stored tables (where a different table may be defined for each combination of rank and the number of transmit antennas). However, in some embodiments, the eNB is further configured to "borrow" one or more unused bits from other defined signaling, to therefore extend the number of bits available for indicating index position. Doing so allows larger tables to be defined, with correspondingly larger numbers of reference signal patterns to choose from, and a correspondingly increased flexibility.

Complementary methods implemented at a mobile station include maintaining one or more defined tables representing a number of reference signal patterns for use by the UE, for sending demodulation reference signals on the uplink. These methods further include receiving signaling from the supporting wireless communication network, e.g., from a serving eNB, where the received signaling indicates an index value into the table (or tables), to be used by the UE for identifying the reference signal pattern to be used. Still further, the methods include the mobile station using the received index information to access the appropriate table and identify the reference signal pattern to be used, and to send demodulation reference signals according to that pattern.

Accordingly, in one example method, implemented in a wireless device, for transmitting reference signals, a signal including a pattern index of B bits for identifying at least one reference signal for use by the wireless device in transmissions is received, wherein each of a plurality of available reference signals is defined by a cyclic shift and an orthogonal cover code. The pattern index is then used to identify the cyclic shift and orthogonal cover code to be used in transmitting each of one or more spatially multiplexed data streams, according to one or more pre-determined tables that map each value of the pattern index to a pattern of cyclic shift and orthogonal cover code combinations for a first multi-layer transmission scenario, such that the patterns define a mapping of orthogonal cover codes and cyclic shifts to transmission layers as a function of the pattern index and where the patterns for the first multi-layer transmission scenario include a first pattern based on a set of cyclic shifts and a second pattern based on the same set of cyclic shifts, wherein each cyclic shift in the set is associated with a corresponding orthogonal cover code in the first pattern and wherein some, but not all, of the cyclic shifts in the set are associated with the same corresponding orthogonal cover codes in the second pattern. In some embodiments, the orthogonal cover codes are the same for each transmission layer in the first pattern but vary across the transmission layers in the second pattern. In either event, each of one or more spatially multiplexed data streams is transmitted using a corresponding reference signal for each data stream.

In another example method, implemented in a first wireless node, for signaling a second wireless node, a first group of B bits to identify the cyclic shift and orthogonal cover code to be used by the second wireless node in transmitting each of one or more spatially multiplexed data streams is selected, according to one or more pre-determined tables that map each value of the first group of B bits to a pattern of cyclic shift and orthogonal cover code combinations for a first multi-layer transmission scenario, such that the patterns define a mapping of orthogonal cover codes and cyclic shifts to transmission layers as a function of the pattern index. Again, the patterns for the first multi-layer transmission scenario include a first pattern based on a set of cyclic shifts and a second pattern based on the same set of cyclic shifts, wherein each cyclic shift in the set is associated with a corresponding orthogonal cover code in the first pattern and wherein some, but not all, of the cyclic shifts in the set are associated with the same corresponding orthogonal cover codes in the second pattern. Likewise, in some embodiments the orthogonal cover codes are the same for each transmission layer in the first pattern but vary across the transmission layers in the second pattern. In either case, a signal including the first group of B bits is then transmitted, for use by the second wireless node in subsequent transmissions.

Mobile station and base station apparatus corresponding generally to the methods summarized above are also disclosed, and include processing circuits configured to carry out one or more of the techniques described herein for signaling and processing reference signal identification information. Of course, those skilled in the art will appreciate that the present invention is not limited to the above features, advantages, contexts or examples, and will recognize additional features and advantages upon reading the following detailed description and upon viewing the accompanying drawings.

BRIEF DESCRIPTION OF THE DRAWINGS

FIG. 4 illustrates additional example mappings of cyclic shift indicator values to cyclic shift and orthogonal cover code patterns.

DETAILED DESCRIPTION

Figure 1:
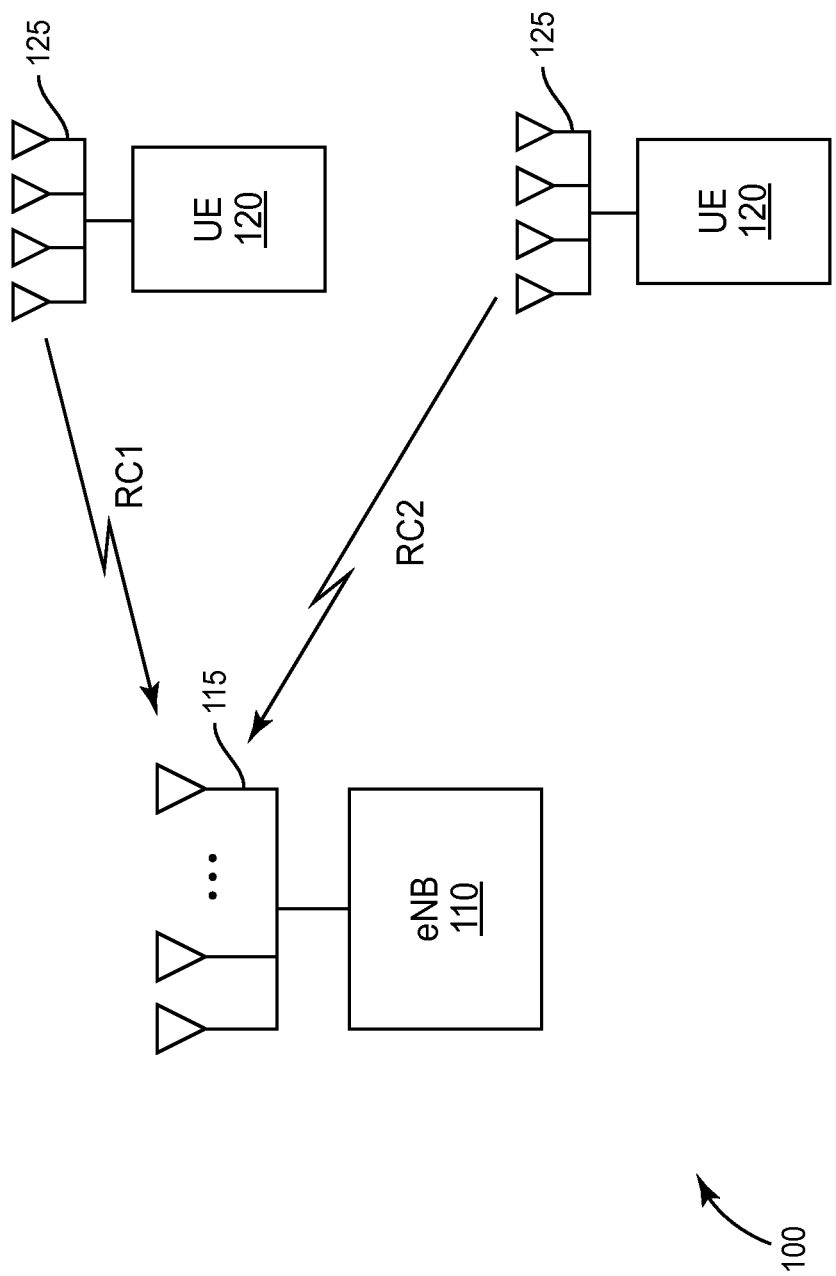
FIG. 1 illustrates a wireless communication system in accordance with some embodiments of the present invention.

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP LTE-Advanced has been used in this disclosure to exemplify the invention, this should not be seen as limiting the scope of the invention to only the aforementioned system. Other wireless systems including or adapted to include multi-layer transmission techniques may also benefit from exploiting the ideas covered within this disclosure.

Also note that terminology such as base station and UE should be considered non-limiting as applied to the principles of the invention. In particular, while detailed proposals applicable to the uplink in LTE-Advanced are described here, the described techniques may be applied to the downlink in other contexts. Thus, in general the base station or eNB in the discussion that follows could be considered more generically as "device 1" and the mobile station or UE considered as "device 2," with these two devices comprising communication nodes communicating with each other over a radio channel.

FIG. 1 illustrates components of a wireless network 100, including base station 110 (labeled eNB, per 3GPP terminology) and mobile stations 120 (each labeled UE, again according to 3GPP terminology). eNB 110 communicates with UEs 120 and 120 using one or more antennas 115; individual ones or groups of these antennas are used to serve pre-defined sectors and/or to support any of various multi-antenna transmission schemes, such as multiple-input multiple-output (MIMO) transmission schemes. Likewise, each UE 120 communicates with eNB 110 using antennas 125. LTE-Advanced is expected to support UEs having up to four transmit antennas, and eNBs having as many as eight. Thus, the pictured UEs 120, each having four antennas, can transmit up to four spatially multiplexed layers to the eNB 110 over radio channels RC1 and RC2, depending on the channel conditions.

Several of the embodiments are described herein in connection with a wireless transceiver in a radio access terminal, such as the mobile stations 120 illustrated in FIG. 1. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Similarly, various embodiments are described herein in connection with a wireless base station, such as the base station 110 illustrated in FIG. 1. Base station 110 communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

Figure 2:
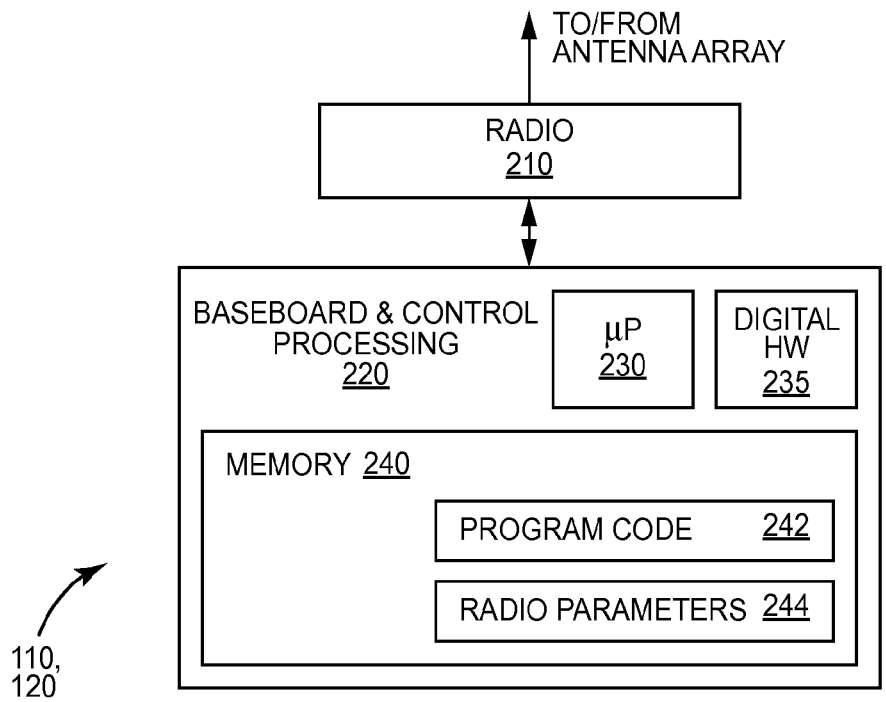
FIG. 2 is a block diagram illustrating components of a wireless node, such as a mobile station or a base station.

FIG. 2 is a block diagram of a wireless transceiver apparatus, illustrating a few of the components relevant to the present techniques, as realized in either a mobile station or a base station. Accordingly, the apparatus pictured in FIG. 2 can correspond to either end of the communication link pictured in FIG. 1, i.e., as either eNB 110 or UE 120.

The pictured apparatus includes radio circuitry 210 and baseband & control processing circuit 220. Radio circuitry 210 includes receiver circuits and transmitter circuits that use known radio processing and signal processing components and techniques, typically according to a particular telecommunications standard such as the 3GPP standard for Wideband CDMA and multi-carrier HSPA. Because the various details and engineering tradeoffs associated with the design of such circuitry are well known and are unnecessary to a full understanding of the invention, additional details are not shown here.

Baseband & control processing circuit 220 includes one or more microprocessors or microcontrollers 230, as well as other digital hardware 235, which may include digital signal processors (DSPs), special-purpose digital logic, and the like. Either or both of microprocessor(s) 230 and digital hardware 240 may be configured to execute program code 242 stored in memory 240, along with radio parameters 244. Again, because the various details and engineering tradeoffs associated with the design of baseband processing circuitry for mobile devices and wireless base stations are well known and are unnecessary to a full understanding of the invention, additional details are not shown here The program code 242 stored in memory circuit 240, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. As will be described in more detail below, radio parameters 244 may include one or more pre-determined tables or other data relating cyclic shifts and orthogonal cover codes to transmission layers for multi-antenna transmission, so that the reference signals can be efficiently mapped to the layers with minimal signaling overhead required to communicate the mapping.

According to the current status of LTE-Advanced specifications for the uplink, a set of potential reference signals is defined, where each reference signal (RS) is uniquely defined by a cyclic shift value (CS) and orthogonal cover code (OCC) applied to a pre-determined sequence. Twelve CS values and 2 OCC values are defined. Both the UE and the eNB need to be aware of the reference signal transmitted for each layer—thus one node needs to signal the other with this information. To facilitate scheduling of multiple UEs, the approach chosen by 3GPP is for the eNB to allocate a reference signal to each layer and to signal the UE with the assignment information.

A straightforward signaling protocol is to signal each UE of the CS/OCC parameters for each layer in the downlink control information, as part of the Packet Data Control Channel (PDCCH). An efficient assignment seeks maximum separation of CS and OCC combinations among the scheduled layers, in order to achieve better performance in channel estimation and to reduce inter-layer interference. Therefore, an efficient signaling protocol achieves a convenient trade-off between low signaling overhead and flexibility in the assignment of the reference signals, to allow high performance and efficient use of the uplink resources.

One proposed approach for signaling the UE of the CS/OCC combinations to apply to each layer in a multi-layer uplink transmission is to employ 3 bits from PDCCH for signaling the CS for a reference layer, e.g., "layer 0", for a given UE. Of course, since only eight CS positions of the possible 12 can be indexed with 3 bits, the signaled CS in this case belongs to a predefined subset of the available CS's. If multiple layers are transmitted by the selected UE, the CS for each remaining layer is automatically defined by calculating a predefined offset from the CS used for the zero-th layer. In one possible approach, the offset between the CS's associated with each of the layers is a function of the rank, i.e., the number of multiplexed layers for the given UE. For instance, if a UE is scheduled to work with rank=2, then the CS position of the zero-th layer, n(0), is signaled by three bits on PDCCH. The CS position for layer 1 is then calculated according to $n(1)=(n(0)+6) \mod 12$.

With this suggested approach, each CS position corresponds to a default OCC value—thus the OCC is automatically defined for each layer without any need for further signaling. Note that if a UE operates in OL (Open Loop) modality, as opposed to the CL (Closed Loop) modality assumed so far, the number of multiplexed reference signals corresponds to the number of physical (or virtualized) antennas. The same approach to signaling the reference signals can be used in this case.

In a variant of the above approach, an additional signaling bit is used to invert the selection of the default OCC associated with each CS, for a given UE. Of course, this feature implies an additional bit in the DL signaling overhead. A related approach is to invert the value of the default OCC value per CS according to semi-static signaling from a higher layer. While this option would not result in additional signaling overhead at the link level, it still requires that more bits are used in the signaling.

The solutions described above have several drawbacks. First, employing three bits from PDCCH for signaling of the CS position is generally a waste of resources, especially when the rank>1. The reason is that it is sufficient to signal only 12/rank positions in the grid of potential CS values if it is assumed that only CS combinations with a maximum inter-layer shift difference are considered. Second, defining a default OCC value per CS position does not allow sufficient flexibility in the resource assignment. In particular, defining a default OCC value per CS does not allow easy support for multi-user MIMO (MU-MIMO) where co-scheduled UEs employ different transmission bandwidths.

Generally speaking, each additional bit on PDCCH increases the overhead and reduces the coverage of control channels, thus adding bits to PDCCH signaling to add flexibility in OCC usage is undesirable. But, semi-static signaling from higher layers is not fast enough to track fast and flexible scheduling at the link layer.

Finally, the solutions described above do not facilitate efficient co-scheduling of R8 and LTE-Advanced UEs (possibly with 2 and/or 4 transmit antennas), particularly with dense MU-MIMO scheduling. Furthermore, co-scheduling of UEs with 4 layers each and unequal bandwidth allocations is not well supported by these approaches.

Several of the techniques described in detail below mitigate the problems described above by exploiting redundancies in the working signaling scheme to improve flexibility, without any need for additional signaling bits on top of the 3 bits currently assigned for CS signaling in Release 8 uplink grants. In several of these approaches, one or more tables that are based on a joint mapping of OCC and CS are used to advantageously define reference signal patterns, for use in assigning reference signal patterns to UEs for subsequent use in uplink transmissions. In at least one embodiment, a reference signal pattern table is defined for each combination of rank and number of transmit antennas.

When considering how the available redundancy in using three bits to identify CS/OCC-to-transmission layer mapping patterns may be exploited, several observations are helpful. First, only eight out of twelve available CS's can be signaled with a pattern index of three bits. As a result, for rank=1, it is only possible to specify a subset of the available CS's. However, when considering multi-layer transmission, the specific ordering (numbering) of the layers in the mapping of layers to CS/OCC combinations does not affect the performance. As a result, when at least two layers are co-scheduled, it becomes redundant to employ three bits for signaling the CS offset of the zero-th layer (as in prior art), since there are only twelve potential CS positions, and thus only six or fewer maximum-distance combinations of CS's for the two or more layers. (More specifically, there are six maximum-distance combinations for two layers, four maximum-distance combinations for three layers, and three maximum-distance combinations for four layers.)

Furthermore, in current specifications for LTE there are signaling fields that are not directly related to uplink demodulation reference symbols, such as the signaling bits used to identify the precoder codebook, that have currently unused values, or values that correspond to unused specific settings (e.g., rank=1, 4 transmit antennas). These unused bits or parameter values might be "borrowed" for use in some embodiments of the present invention, e.g., to index into a greater number of demodulation reference signal patterns within a table.

Accordingly, one general approach to signaling CSS/OCC combinations to a UE (or other wireless node) for use in determining which reference signals should be mapped to subsequent transmission layers employs explicit signaling of B=log 2(N) bits in the uplink grant, where N equals the number of unique patterns that can be signaled. (In the LTE-Advanced scenario discussed above, N=8 and B=3.) With this approach, each of the N entries corresponds to a unique predefined joint mapping of OCC and CS values per layer. In some embodiments, a given value for the signaled bits always maps into a single table or other data structure that correlates the signaled values with patterns of CS/OCC assignments to transmission layers. In other embodiments, several tables or other data structures may exist, in which case the mapping of signaled values to CSS/OCC assignment patterns may vary depending on additional factors, such as transmission rank, number of transmit antennas used by the UE, the selected codebook, the transmission modality (e.g., Open Loop, Closed Loop, Transmit Diversity).

Figure 3:
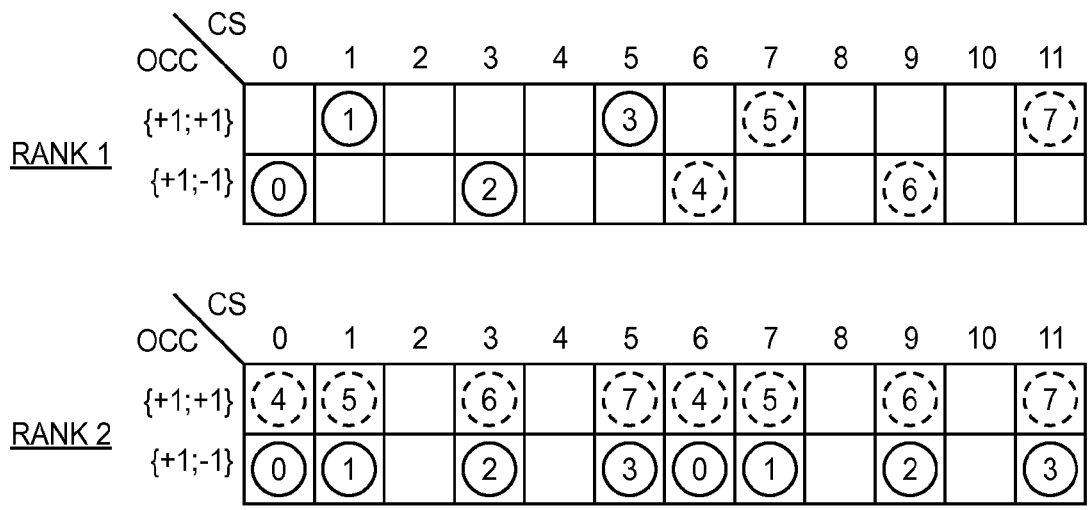
FIG. 3 illustrates an example mapping of cyclic shift indicator values to cyclic shift and orthogonal cover code patterns.

An example of a set of tables that might be used by a UE having two antennas is given in FIG. 3. Two tables are provided—the first is used for one-layer transmission, while the second applies to two-layer transmission. Of course, those skilled in the art will appreciate that the information in these two tables could instead be presented in a single table. The rows in each table correspond to the two available OCC's ({+1, +1}, {+1, −1}), while each column corresponds to one of the twelve available CS's. The entries in each table, 0 to 7, correspond to the patterns identified by the three signaling bits sent from the eNB. Thus, referring first to the rank 1 table, a UE that receives three bits indicating pattern 5 will use a CS of 7 along with an OCC of {+1, +1}. If that UE instead receives three bits indicating pattern 2, then it will use a CS of 3 along with an OCC of {+1, −1}. If the UE is transmitting two layers, however, it uses the rank 2 table. In this case, if the UE is assigned to pattern 5, then it uses a CS of 1 for one layer and a CS of 7 for the second layer. The reference signal on both layers uses an OCC of {+1, −1}. If the UE is instead assigned to pattern 2, the UE uses a CS of 3 for one layer and a CS of 9 for the other, with an OCC of {+1, −1} used for both. Indeed, in the rank 2 table of FIG. 3, each of the eight reference signal patterns includes two entries, one for each transmission layer, and each pattern identifies two CS's, each of the two CS's in a pattern associated with a single OCC.

As noted earlier, the performance is not affected by the order in which a set of CS/OCC combinations is assigned to layers, thus the actual numbering of the layers with the pattern is a matter of design choice. For instance, referring to the rank 2 table of FIG. 3, the two CS's identified by a given signaling value can be assigned to layer 0 and layer 1 by working from the left to the right, or vice-versa, provided only that the UE and eNB share the same approach.

The tables provided in FIG. 3 are only an example—many other mappings of signaling values to various patterns of CS/OCC combinations are possible. It will also be appreciated that similar tables can be constructed to accommodate different numbers of OCC's and CS's, in systems that adopt a different reference signal scheme. Furthermore, as suggested above, the tables mapping signaling bits to CS/OCC patterns may also be made to depend on additional or alternative variables, such as transmission mode and/or the level of UE mobility. With this latter approach, the flexibility is further increased without requiring additional signaling.

A flexible signaling scheme should facilitate the efficient co-scheduling of several mobile terminals in MU-MIMO mode, where each mobile may be transmitting on one or several layers. Accordingly, in some embodiments the CS/OCC patterns for UEs with two transmit antennas are designed for one-layer transmission (rank=1) in such a way that, for at least one of the available CS values, the opposite default OCC value is selected with respect to the corresponding pattern for UEs having four transmit antennas. For the same reason, some embodiments provide that for each table of available CS/OCC patterns for rank greater than or equal to 2, one or more patterns having the same OCC value for all layers and one or more patterns having alternating OCC values between their layers are present.

Figure 4:
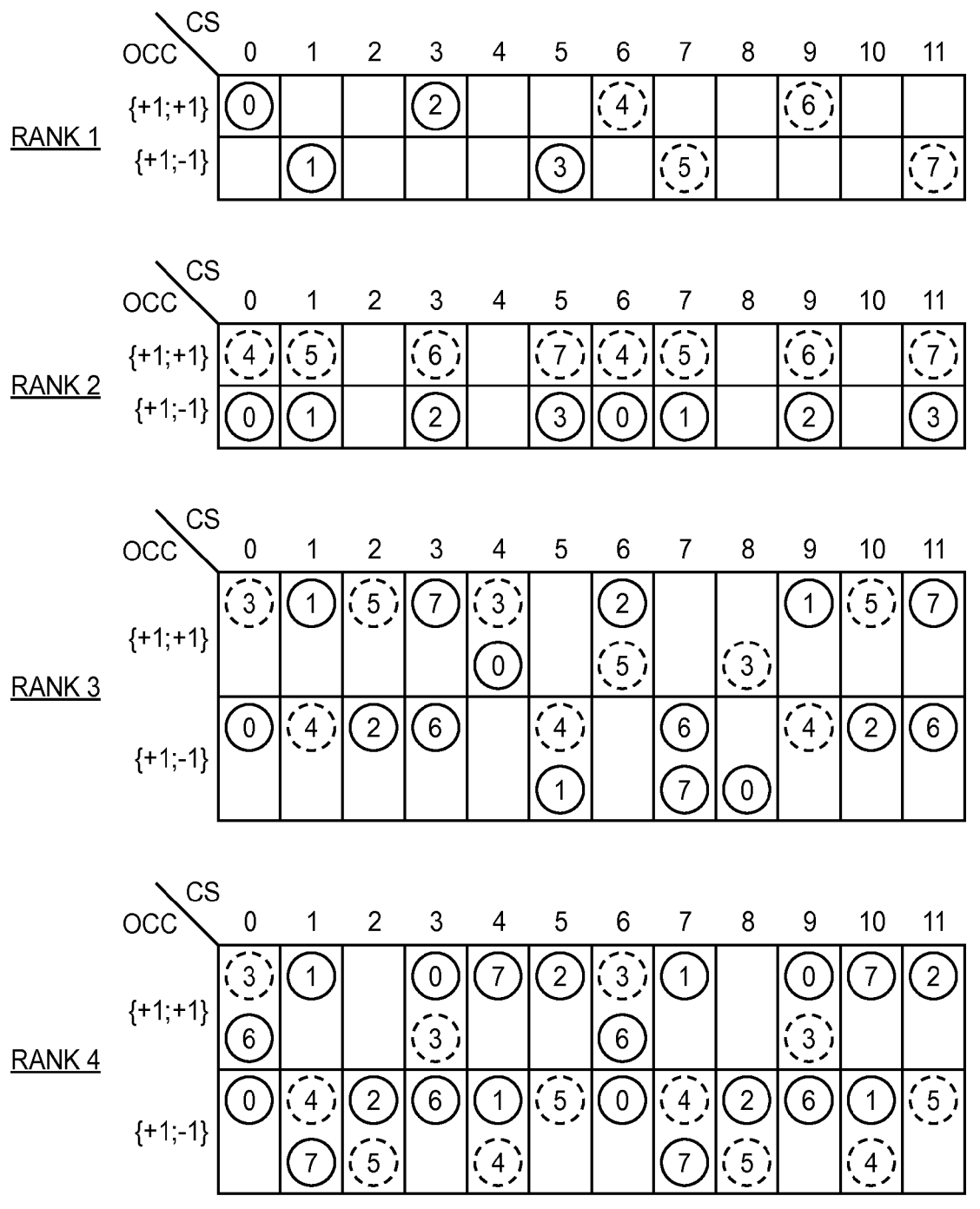

Both of these approaches can be seen in the example tables provided in FIGS. 3 and 4. For example, in the rank 1 table of FIG. 3 (for 2-antenna UEs), pattern 1 identifies a CS value of 1 and an OCC of {+1, +1}. In the rank 1 table of FIG. 4 (for 4-antenna UEs), however, pattern 1 identifies a CS value of 1 and an OCC of {+1, −1}. Thus, the opposite OCC value is used by 2-antenna and 4-antenna UEs. This use of complementary rank-1 patterns between 2-antenna and 4-antenna UEs allows enhanced co-scheduling 2-antenna and 4-antenna UEs, without any need for additional signaling to distinguish between the two patterns. Of course, the organization of the tables in FIGS. 3 and 4 is merely an example; the information in two or more of these tables might be combined in a single table, in some embodiments.

Examining the tables of FIG. 4 more closely, it can also be observed that the rank 3 and rank 4 tables include patterns in which the OCC values are constant across all of the layers as well as patterns in which the OCC values vary. For instance, in the rank 4 table, patterns 0, 1, 2, 6, and 7 each assign varying OCC's to the four transmission layers. Patterns 3, 4, and 5, on the other hand, use the same OCC for all four transmission layers. This approach allows improved scheduling flexibility and performance in MU-MIMO scenarios.

More particularly, consider Tables 1 and 2 below, which list CS/OCC assignments from FIG. 4 for four-antenna UEs, for rank-4 transmissions. Table 1 lists the assignments for pattern 6, while Table 2 shows the corresponding assignments for pattern 3.

TABLE 1

Pattern 6

| Layer Index | CS Value | OCC Value |
|---|---|---|
| 0 | 0 | {+1, +1} |
| 1 | 3 | {+1, −1} |
| 2 | 6 | {+1, +1} |
| 3 | 9 | {+1, −1} |

TABLE 2

Pattern 3

| Layer Index | CS Value | OCC Value |
|---|---|---|
| 0 | 0 | {+1, +1} |
| 1 | 3 | {+1, +1} |
| 2 | 6 | {+1, +1} |
| 3 | 9 | {+1, +1} |

First, it can be observed that a CS value of 0 is assigned to layer 0 in both patterns. Furthermore, in both patterns the OCC value corresponding to CS=0 is the same, i.e., {+1, +1}. Likewise, a CS value of 3 is assigned to layer 1 in both patterns. However, in this case, opposite OCC values correspond to this CS value in the two patterns.

In some embodiments, when considering all the possible patterns (where a "pattern" refers to a set of CS/OCC-to-layer assignments corresponding to a given signaling value) in at least one table there is at least one CS that is corresponds to two different OCC values in at least one pair of patterns, and at least one CS value that is associated to the same OCC value in that same pair of patterns. As an example, consider patterns 0 and 3 in the rank-4 table of FIG. 4. Each of these patterns uses a CS of 0, but with different OCC's. Each of these two patterns also uses a CS of 3, but with the same OCC. Once again, this approach allows for extra flexibility in co-scheduling MU-MIMO terminals.

Thus, in several embodiments of the present invention, the eNB (or other supporting network node) and the UE (or other item of user equipment) are each configured with one or more tables or equivalent data structures that are used for indicating and selecting the pattern(s) of demodulation reference signals to be used by the UE in subsequent uplink transmissions. In some embodiments, the eNB signals to each UE the pattern that should be used by that UE by simply indicating the table index value. In this case, the UE, which is configured with a table or equivalent data structure that matches the one used by the eNB, retrieves the pattern identified by the signal from the eNB, and uses the identified mapping to assign reference signals to transmission layers. The three bits allocated for reference signal assignments in previous LTE releases can be used for this purpose, or other bits may be used, and, further, one or more additional, currently unused bits may be used for increasing the size of the reference signal pattern tables.

Designed appropriately, the tables optimize or at least improve the separation between reference signals for both single-user (SU) and multiple-user (MU) MIMO scenarios. As one example, a table applicable to a given scenario is configured to include reference signal patterns using one OCC, and patterns that alternate between OCCs. Again, a pattern refers to a set of CS/OCC combinations mapped to the transmission layers. Each signaling value, e.g., 3-bit value, identifies one of those patterns. So, given a pattern index of three signaling bits to identify the pattern, a table includes eight patterns. This definition permits the eNB to choose reference signal patterns that fall within one OCC or span both OCCs, allowing extra flexibility in assigning reference signal patterns in cases where separation in the CS domain is sufficient, and in cases where separation in the CS domain is not sufficient.

This flexibility in selecting the correspondence between a given CS and the OCC is useful because the OCC is a good separator between two reference signals transmitted by co-scheduled UEs in a MU-MIMO scenario, at least when those UEs are operating in relatively low-mobility scenarios. For example, consider two UEs that are co-scheduled (MU-MIMO), both operating with rank=3. In this case, the use of different CS's by the two UE's does not, by itself, yield good separation of the respective reference signals as received by the eNB. Thus, several of the embodiments contemplated herein are configured to provide tables that provide a first subset of rank=3 patterns, where the OCC and the CS is varied within each pattern, and a second subset of rank=3 patterns, wherein the OCC is held constant within each pattern, while the CS is varied. With this approach, the eNB has great flexibility in assigning the reference signal patterns that yield the best separation, given the particular scenario involved.

In some embodiments of the invention, the eNB is configured to use the three bits defined in previous releases of the LTE standards for reference signal assignments, to provide an indication of one of eight different index positions into any of the stored tables (where a different table may be defined for each combination of rank and the number of transmit antennas). However, in some embodiments, the eNB is further configured to "borrow" one or more unused bits from other defined signaling, to therefore extend the number of bits available for indicating index position. Doing so allows larger tables to be defined, with correspondingly larger numbers of reference signal patterns to choose from, and a correspondingly increased flexibility.

Figures 5, 6:
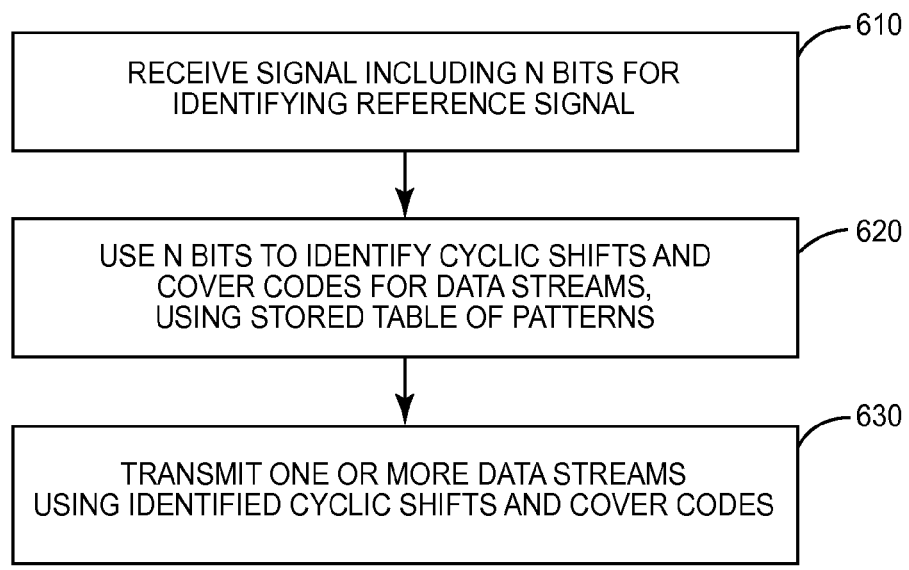
FIG. 5 illustrates another example of mappings of cyclic shift indicator values to cyclic shift and orthogonal cover code patterns.
FIG. 6 is a process flow diagram illustrating a method for transmitting reference signals with one or more data streams.

An example of such an approach is illustrated by the example table of rank-1 patterns for four-antenna UEs provided in FIG. 5. This table includes 16 patterns, of which only eight can be directly indexed using just the three bits transmitted on PDCCH. However, the proposed precoder for rank=1 and four transmit antennas contains only 24 elements, while the indexing is performed with six bits (64 possible values). Therefore, it is possible to use one bit from the codebook index, in combination with the three bits on the PDCCH, for signaling the uplink demodulation reference signals to be used, in the event that rank=1 transmission is performed with four transmit antennas. As an example, the extra bit from the codebook index could be used as the most significant bit, to identify either patterns 0-7 or patterns 8-15, while the three bits from the PDCCH are used as the least significant bits, to identify the exact pattern. Of course, this approach is not limited to the codebook field, but can be applied also to other partly unused signaling fields in the uplink grant, e.g., if the most dynamic flexibility is required, or even in less frequent signaling messages, e.g., if less dynamic flexibility is acceptable.

As noted, a different table may be used for different MIMO "modalities." In one embodiment, for example, there are different tables, or different sub-tables, defined for different combinations of rank and the number of transmit antennas. Thus, the eNB may track or otherwise identify the appropriate table to use based on the modality, and determine the correct index value to use for each of one or more UEs. In at least one such embodiment, the eNB jointly evaluates the set of UEs that are co-scheduled in a MU-MIMO context, and determines the combination of reference signal pattern assignments that yields the best separation between reference signals at the eNB. Further, it should be understood that each UE may store several different reference signal pattern tables, corresponding to those used by the eNB, for use in different operating scenarios, and the UE may be configured to select the appropriate table based on rank and number of antennas, and/or based on other variables. Further, for a given rank and number of antennas, there may be more than one defined table to pick from, selected, for example, based either on the evaluation of one or more variables, such as MIMO mode, UE mobility, etc.

In view of the various techniques described above, it will be appreciated that the process flow diagram of FIG. 6 illustrates a generalized embodiment of several of the above techniques, as might be implemented in a wireless device that receives signaling indicating a reference signal pattern. Thus, as indicated at block 610, the illustrated method begins with receiving a signal that includes B bits for identifying at least one reference signal for use by the wireless device in transmissions, where each of a plurality of available reference signals is defined by a cyclic shift and an orthogonal cover code. As noted earlier, in an Advanced-LTE system, the wireless device is a mobile station, or UE, and B=3.

As shown at block 620, the method next includes using the B bits to identify the cyclic shift and orthogonal cover code to be used in transmitting a data stream or each of one or more spatially multiplexed data streams, according to one or more pre-determined tables that map each value of the B bits to a pattern of cyclic shift and orthogonal cover code combinations for at least one multi-layer or multi-antenna transmission scenario. In general, the patterns define a mapping of orthogonal cover codes and cyclic shifts to transmission layers as a function of the pattern index and, in some cases, as a function of the number of transmit antennas to be used in the transmission. In some embodiments, the patterns for a multi-layer transmission scenario include a first pattern based on a set of cyclic shifts and a second pattern based on the same set of cyclic shifts, wherein each cyclic shift in the set is associated with a corresponding orthogonal cover code in the first pattern and wherein some, but not all, of the cyclic shifts in the set are associated with the same corresponding orthogonal cover codes in the second pattern. In some of these and in some other embodiments, the patterns for the multi-layer transmission scenario include a first pattern in which the orthogonal cover codes are the same for each transmission layer and a second pattern in which the orthogonal codes vary across the transmission layers While several examples of these tables, e.g., for two-layer, three-layer, and four-layer transmission, were described above in connection with FIGS. 3-5, the method of FIG. 6 is not limited to those exact tables nor is the method limited to four or fewer layers.

Finally, as indicated at block 630, each of one or more spatially multiplexed data streams are transmitted using a corresponding reference signal for each data stream, wherein the corresponding reference signals are those identified with the B bits.

As discussed above, in some embodiments, the pre-determined tables specify a first set of patterns for multi-layer transmission using two transmit antennas and a second set of patterns for multi-layer transmission using four transmit antennas, wherein the first and second set of patterns include at least one cyclic shift value that has different corresponding orthogonal cover codes for two-antenna and four-antenna transmission. In these embodiments and in other embodiments, the patterns may map orthogonal cover codes and cyclic shifts to transmission layers as a function of the pattern index and as a function of the number of antennas to be used for transmitting the at least one data stream. These latter embodiments are not necessarily limited to multi-stream transmission, as this same approach may be applied to patterns for rank-one transmissions with one or several antennas.

In some embodiments, the multi-layer transmission scenario described above may be a three-layer transmission scenario. In some of these embodiments, the one or more tables further map each value of the pattern index to an additional pattern of cyclic shift and orthogonal cover code combinations for a four-layer transmission scenario, wherein the additional patterns define a mapping of orthogonal cover codes and cyclic shifts to transmission layers as a function of the pattern index and wherein the additional patterns for the four-layer transmission scenario include a third pattern in which the orthogonal cover codes are the same for each transmission layer and a fourth pattern in which the orthogonal codes vary across the transmission layers. In some of these others and in some other embodiments in which patterns for three-layer and four-layer transmissions are specified, the third and fourth patterns each include at least one cyclic shift that is associated with a different orthogonal cover code in each of the third and fourth patterns, and wherein the third and fourth patterns each include at least one other cyclic shift that is associated with the same orthogonal cover code in each of the third and fourth patterns.

In any of the above embodiments, the one or more pre-determined tables may specify one or more patterns that are identified by one or more other parameters, in addition to the B bits, in which case the method pictured in FIG. 6 includes identifying the cyclic shift and orthogonal cover code to be used in transmitting each of one or more spatially multiplexed data streams based on the one or more other parameters. These one or more other parameters comprise at least one of: a transmission rank, a number of transmit antennas available to the wireless device, a codebook selection, and a transmission modality type.

Figure 7:
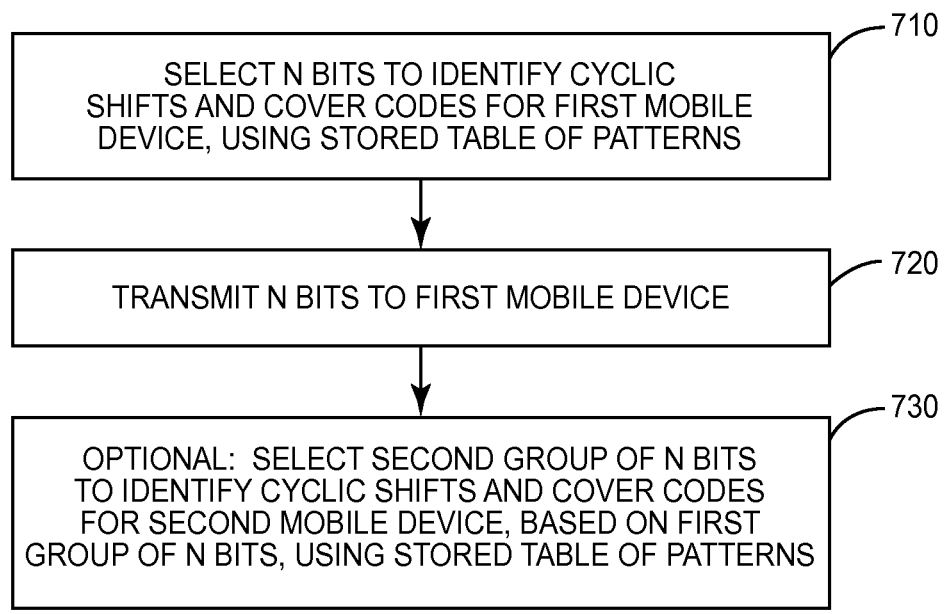
FIG. 7 is another process flow diagram illustrating a method for signaling a wireless node of reference signals to be used by the wireless node in transmitting one or more data streams.

The process flow diagram of FIG. 7 illustrates an example method that is implemented at the other end of the wireless link from the device that carries out the method of FIG. 6. In an Advanced-LTE system, for example, the device carrying out the method of FIG. 7 is likely to be the eNB. This method, as shown at block 710, begins with the selection of a first group of B bits to identify the cyclic shift and orthogonal cover code to be used by the second wireless node in transmitting each of one or more spatially multiplexed data streams, according to one or more pre-determined tables that map each value of the first group of B bits to a pattern of cyclic shift and orthogonal cover code combinations for one-layer and two-layer transmissions. As shown at block 720, the first group of B bits are then transmitted to the second wireless node.

As discussed in detail above, the tables that define the mapping of cyclic shifts and orthogonal cover codes to transmission layers can be designed to facilitate efficient co-scheduling of mobile stations in MU-MIMO mode. Thus, as shown at block 730, some embodiments of the method of FIG. 7 include an additional step in which a second group of B bits are selected, for a third wireless node, and transmitted to the third wireless node for its use in transmitting one or more spatially multiplexed layers to the first node. Like the first group of B bits, this second group of B bits is selected according to the stored tables described above. However, for co-scheduling, the selection of the second group of B bits is also based on the selection of reference signals for the second wireless node. Thus, the selection of the second group of B bits is based on the first group of B bits.

As with the method illustrated in FIG. 6, the one or more pre-determined tables used in the method of FIG. 7 may specify a first set of patterns for multi-layer transmission using two transmit antennas and a second set of patterns for multi-layer transmission using four transmit antennas, in some embodiments, wherein the first and second set of patterns include at least one cyclic shift value that has different corresponding orthogonal cover codes for two-antenna and four-antenna transmission.

In some cases, the one or more pre-determined tables specify a third set of patterns for three-layer transmissions and a fourth set of patterns for four-layer transmissions, at least one of the third and fourth sets of patterns including a first pattern in which the same orthogonal cover code is used for each layer and a second pattern in which different orthogonal cover codes are assigned to two or more of the layers. At least one of the third and fourth sets of patterns in some of these embodiments includes a third pattern and a fourth pattern, wherein the third and fourth patterns each include at least one cyclic shift that is associated with a different orthogonal cover code in each of the third and fourth patterns, and each include at least one other cyclic shift that is associated with the same orthogonal cover code in each of the third and fourth patterns.

Also like the method illustrated in FIG. 6, in the method illustrated in FIG. 7, the one or more pre-determined tables in some embodiments may specify one or more patterns that are identified by one or more other parameters, in addition to the first group of B bits, and wherein the first group of B bits are selected based on the one or more other parameters.

As suggested above, in some embodiments of the invention, processing circuits, such as the baseband & control processing circuits 220 of FIG. 2, are configured to carry out one or more of the methods describe above, including the methods pictured in FIGS. 6 and 7. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method, implemented in a wireless device, for transmitting reference signals, wherein each of a plurality of available reference signals is defined by a cyclic shift and a corresponding orthogonal cover code, the method comprising:
receiving a signal including a pattern index of B bits for identifying at least one reference signal for use by the wireless device in transmissions; and
using the pattern index to identify the cyclic shift and orthogonal cover code to be used in transmitting each of one or more spatially multiplexed data streams, according to one or more pre-determined tables that map each value of the pattern index to a pattern of cyclic shift and orthogonal cover code combinations for a first multi-layer transmission scenario, wherein the patterns define mappings of orthogonal cover codes and cyclic shifts to transmission layers as a function of the pattern index and wherein the patterns for the first multi-layer transmission scenario include a first pattern based on a set of cyclic shifts and a second pattern based on the same set of cyclic shifts, wherein each cyclic shift in the set is associated with a corresponding orthogonal cover code in the first pattern and wherein some, but not all, of the cyclic shifts in the set are associated with the same corresponding orthogonal cover codes in the second pattern; and
transmitting each of the one or more spatially multiplexed data streams using the identified reference signal corresponding to each data stream.

2. The method of claim 1, wherein B=3 and wherein each value of the pattern index identifies a unique mapping of orthogonal cover codes and cyclic shifts to transmission layers for the first multi-layer transmission scenario.

3. The method of claim 1, wherein the patterns specified for the first multi-layer transmission scenario include a first set of patterns for use with a first number of transmit antennas and a second set of patterns, differing from the first set of patterns, for use with a different number of transmit antennas.

4. The method of claim 3, wherein the first set of patterns is for use with two transmit antennas and the second set of patterns is for use with four transmit patterns, and wherein the first and second patterns include at least one cyclic shift value that has different corresponding orthogonal cover codes for two-antenna and four-antenna transmission.

5. The method of claim 1, wherein the orthogonal cover codes are the same for each transmission layer in the first pattern but vary across the transmission layers in the second pattern.

6. The method of claim 1, wherein the first multi-layer transmission scenario is a three-layer transmission scenario and wherein the one or more pre-determined tables further map each value of the pattern index to an additional pattern of cyclic shift and orthogonal cover code combinations for a four-layer transmission scenario, wherein the additional patterns define a mapping of orthogonal cover codes and cyclic shifts to transmission layers as a function of the pattern index and wherein the additional patterns for the four-layer transmission scenario include a third pattern in which the orthogonal cover codes are the same for each transmission layer and a fourth pattern in which the orthogonal codes vary across the transmission layers.

7. The method of claim 6, wherein either the patterns for the three-layer transmission scenario or the additional patterns for the four-layer transmission scenario, or both, include a fifth pattern and a sixth pattern, wherein the fifth and sixth patterns each include at least one cyclic shift that is associated with a different orthogonal cover code in each of the fifth and sixth patterns, and wherein the fifth and sixth patterns each include at least one other cyclic shift that is associated with the same orthogonal cover code in each of the fifth and sixth patterns.

8. The method of claim 1, wherein the one or more pre-determined tables specify one or more patterns that are identified by one or more other parameters, in addition to the B bits, the method further comprising identifying the cyclic shift and orthogonal cover code to be used in transmitting each of one or more spatially multiplexed data streams based on the one or more other parameters, wherein the one or more other parameters comprises at least one of: a transmission rank, a number of transmit antennas available to the wireless device, a codebook selection, and a transmission modality type.

9. A wireless device configured to transmit reference signals, the wireless device comprising:
a radio circuit configured to transmit each of one or more spatially multiplexed data streams using a corresponding reference signal for each data stream, wherein each of a plurality of available reference signals is defined by a cyclic shift and a corresponding orthogonal cover code, and
a processing circuit configured to
receive a signal including B bits for identifying at least one reference signal for use by the wireless device in transmissions; and
use the B bits to identify the cyclic shift and orthogonal cover code to be used in transmitting each of one or more spatially multiplexed data streams, according to one or more pre-determined tables that map each value of the B bits to a pattern of cyclic shift and orthogonal cover code combinations for a first multi-layer transmission scenario, wherein the patterns define mappings of orthogonal cover codes and cyclic shifts to transmission layers as a function of the pattern index and wherein the patterns for the first multi-layer transmission scenario include a first pattern based on a set of cyclic shifts and a second pattern based on the same set of cyclic shifts, wherein each cyclic shift in the set is associated with a corresponding orthogonal cover code in the first pattern and wherein some, but not all, of the cyclic shifts in the set are associated with the same corresponding orthogonal cover codes in the second pattern.

10. The wireless device of claim 9, wherein B=3 and wherein each value of the pattern index identifies a unique mapping of orthogonal cover codes and cyclic shifts to transmission layers for the first multi-layer transmission scenario.

11. The wireless device of claim 9, wherein the one or more pre-determined tables specify a first set of patterns for single-layer transmission using two transmit antennas and a second set of patterns for single-layer transmission using four transmit antennas, wherein the first and second set of patterns include at least one cyclic shift value that has different corresponding orthogonal cover codes for two-antenna and four-antenna transmission.

12. The wireless device of claim 11, wherein the first set of patterns is for use with two transmit antennas and the second set of patterns is for use with four transmit patterns, and wherein the first and second patterns include at least one cyclic shift value that has different corresponding orthogonal cover codes for two-antenna and four-antenna transmission.

13. The wireless device of claim 9, wherein the orthogonal cover codes are the same for each transmission layer in the first pattern but vary across the transmission layers in the second pattern.

14. The wireless device of claim 9, wherein the first multi-layer transmission scenario is a three-layer transmission scenario and wherein the one or more pre-determined tables further map each value of the pattern index to an additional pattern of cyclic shift and orthogonal cover code combinations for a four-layer transmission scenario, wherein the additional patterns define a mapping of orthogonal cover codes and cyclic shifts to transmission layers as a function of the pattern index and wherein the additional patterns for the four-layer transmission scenario include a third pattern in which the orthogonal cover codes are the same for each transmission layer and a fourth pattern in which the orthogonal codes vary across the transmission layers.

15. The wireless device of claim 14, wherein either the patterns for the three-layer transmission scenario or the additional patterns for the four-layer transmission scenario, or both, include a fifth pattern and a sixth pattern, wherein the fifth and sixth patterns each include at least one cyclic shift that is associated with a different orthogonal cover code in each of the fifth and sixth patterns, and wherein the fifth and sixth patterns each include at least one other cyclic shift that is associated with the same orthogonal cover code in each of the fifth and sixth patterns.

16. The wireless device of claim 9, wherein the one or more pre-determined tables specify one or more patterns that are identified by one or more other parameters, in addition to the B bits, and wherein the processing circuit is configured to identify the cyclic shift and orthogonal cover code to be used in transmitting each of one or more spatially multiplexed data streams based on the one or more other parameters, wherein the one or more other parameters comprises at least one of: a transmission rank, a number of transmit antennas available to the wireless device, a codebook selection, and a transmission modality type.

* * * * *

UNITED STATES PATENT AND TRADEMARK OFFICE
CERTIFICATE OF CORRECTION

| | | |
|---|---|---|
| PATENT NO. | : 8,804,686 B2 | Page 1 of 1 |
| APPLICATION NO. | : 13/020853 | |
| DATED | : August 12, 2014 | |
| INVENTOR(S) | : Sorrentino et al. | |

It is certified that error appears in the above-identified patent and that said Letters Patent is hereby corrected as shown below:

In the Drawings:

In Fig. 6, Sheet 4 of 5, for Tag "610", in Line 1, delete "N BITS" and insert -- B BITS --, therefor.

In Fig. 6, Sheet 4 of 5, for Tag "620", in Line 1, delete "N BITS" and insert -- B BITS --, therefor.

In Fig. 7, Sheet 5 of 5, for Tag "710", in Line 1, delete "N BITS" and insert -- B BITS --, therefor.

In Fig. 7, Sheet 5 of 5, for Tag "720", in Line 1, delete "N BITS" and insert -- B BITS --, therefor.

In Fig. 7, Sheet 5 of 5, for Tag "730", in Line 1, delete "N BITS" and insert -- B BITS --, therefor.

In Fig. 7, Sheet 5 of 5, for Tag "730", in Line 4, delete "N BITS," and insert -- B BITS, --, therefor.

Signed and Sealed this
Twenty-ninth Day of December, 2015

Michelle K. Lee
*Director of the United States Patent and Trademark Office*